US011990927B2

(12) United States Patent
Huang et al.

(10) Patent No.: US 11,990,927 B2
(45) Date of Patent: May 21, 2024

(54) METHOD FOR IMPROVING PERFORMANCE OF LOW-INTERMEDIATE FREQUENCY RECEIVER, STORAGE MEDIUM, AND RECEIVER

(71) Applicant: HYTERA COMMUNICATIONS CORPORATION LIMITED, Guangdong (CN)

(72) Inventors: Ni Huang, Guangdong (CN); Dawu He, Guangdong (CN); Cunhao Gao, Guangdong (CN); Guangbin Huang, Guangdong (CN); Yongdong Wang, Guangdong (CN)

(73) Assignee: HYTERA COMMUNICATIONS CORPORATION LIMITED, Guangdong (CN)

( * ) Notice: Subject to any disclaimer, the term of this patent is extended or adjusted under 35 U.S.C. 154(b) by 253 days.

(21) Appl. No.: 17/608,640

(22) PCT Filed: Mar. 3, 2020

(86) PCT No.: PCT/CN2020/077646
§ 371 (c)(1),
(2) Date: Nov. 3, 2021

(87) PCT Pub. No.: WO2020/224315
PCT Pub. Date: Nov. 12, 2020

(65) Prior Publication Data
US 2022/0224363 A1 Jul. 14, 2022

(30) Foreign Application Priority Data

May 5, 2019 (CN) .......................... 201910368255.6

(51) Int. Cl.
*H04B 1/10* (2006.01)

(52) U.S. Cl.
CPC ... *H04B 1/1027* (2013.01); *H04B 2001/1045* (2013.01)

(58) Field of Classification Search
CPC . H04B 1/1027; H04B 2001/1045; H04B 1/10
See application file for complete search history.

(56) References Cited

U.S. PATENT DOCUMENTS

| 9,413,402 B1 | 8/2016 | Mayer et al. | |
|---|---|---|---|
| 2016/0191089 A1* | 6/2016 | Chen | H04W 72/20 455/296 |

FOREIGN PATENT DOCUMENTS

| CN | 101151810 A | 3/2008 |
|---|---|---|
| CN | 102025382 A | 4/2011 |

(Continued)

OTHER PUBLICATIONS

Sipo, "1st CN Office Action and Search Report for CN Application No. 201910368255.6", China.

(Continued)

*Primary Examiner* — Sam K Ahn
*Assistant Examiner* — Amneet Singh
(74) *Attorney, Agent, or Firm* — Locke Lord LLP; Tim Tingkang Xia, Esq.

(57) ABSTRACT

Disclosed in the present application are a method for improving performance of a low-intermediate frequency receiver, a storage medium, and a receiver. The method comprises: selecting a local oscillator signal from a preset local oscillator frequency set as an initial local oscillator signal to perform frequency mixing processing on an input signal, so as to obtain a low-intermediate frequency signal comprising a low-intermediate frequency useful signal and a low-intermediate frequency interference signal; determining whether an energy ratio of the low-intermediate frequency interference signal to the low-intermediate frequency useful signal is greater than a first preset ratio; and (Continued)

if the energy ratio is greater than the first preset ratio, selecting another local oscillator frequency from the preset local oscillator frequency set as the current local oscillator signal to process the input signal. In this way, the present application can improve the adjacent channel selectivity of a low-intermediate frequency receiver.

17 Claims, 6 Drawing Sheets

(56) References Cited

FOREIGN PATENT DOCUMENTS

| | | | | |
|---|---|---|---|---|
| CN | 103346812 A | 10/2013 | | |
| CN | 103368589 A | 10/2013 | | |
| KR | 20100055797 A | * 5/2010 | ......... | H04L 27/2647 |
| WO | 00/11794 | 3/2000 | | |
| WO | 2015017986 A1 | 2/2015 | | |

OTHER PUBLICATIONS

Sipo, "2nd CN Office Action and Search Report for CN Application No. 201910368255.6", China.

China Intellectual Property Office (ISR/CN), "International Search Report for PCT/CN2020/077646", China, May 14, 2020.

* cited by examiner

METHOD FOR IMPROVING PERFORMANCE OF LOW-INTERMEDIATE FREQUENCY RECEIVER, STORAGE MEDIUM, AND RECEIVER

FIELD OF THE INVENTION

The present application relates generally to the field of communication technologies, and in particularly, to a method for improving performance of a low-intermediate frequency receiver, a storage medium, and a receiver.

BACKGROUND OF THE INVENTION

A zero-intermediate frequency solution has advantages of high integration, a small volume, low costs, low power consumption, not requiring an image frequency suppression filter, and the like. Therefore, enterprises adopt the zero-intermediate frequency solution to replace a superheterodyne solution. However, the zero-intermediate frequency solution also has defects. For example, direct currents need to be removed, or it is very sensitive to the I/Q unbalance degree of signals, resulting in poor blocking performance. The blocking performance of the zero-intermediate frequency solution is poorer than that of the superheterodyne solution by 19 dB. Thus, the zero-intermediate frequency solution is easily subjected to interference from external signals, which is unacceptable during actual application.

During long-term research and development, inventors of the present application found that, a low-intermediate frequency solution may be adopted for resolving problems existing in the zero-intermediate frequency solution, so that the blocking performance may basically approximate the superheterodyne solution. However, the static low-intermediate frequency solution may cause adjacent channel selectivity (ACS) indexes of an upper adjacent channel or a lower adjacent channel to reduce by about 24 dB, which is also unacceptable. Therefore, the static low-intermediate frequency solution cannot resolve all of the problems.

In the prior art, a method for resolving the reduction of the ACS includes determining, by using an energy difference, whether adjacent channel interference exists, and then determining, according to a magnitude of the adjacent channel interference, whether a low-intermediate frequency local oscillator is switched. However, a received channel bandwidth must be maintained to include a local signal and adjacent channel interference signals on two sides at all times. Although filtering processing is performed on a software backend, once noise enters from hardware, software filtering cannot achieve the effect of hardware filtering, influencing the receiving of a sensitivity index. Another method includes directly calculating first interference and second interference to determine an offset direction of the low-intermediate frequency local oscillator. However, at the beginning, the local oscillator is required to be switched for two or three times at least to determine which side the low-intermediate frequency local oscillator is located on. Stored interference data are updated by cyclically switching the local oscillator. However, a calling state may cause a cyclic error code.

SUMMARY OF THE INVENTION

One of the objectives of the present application is to provide a method for improving performance of a low-intermediate frequency receiver, a storage medium, and a receiver. In this way, the adjacent channel selectivity (ACS) of the low-intermediate frequency receiver can be improved.

In order to resolve the foregoing technical problem, a technical solution adopted by the present application is to provide a method for improving performance of a low-intermediate frequency receiver. The method includes: selecting a local oscillator signal from a preset local oscillator frequency set as an initial local oscillator signal to perform frequency mixing on an input signal, so as to obtain a low-intermediate frequency signal, the low-intermediate frequency signal includes a low-intermediate frequency useful signal and a low-intermediate frequency interference signal; determining whether an energy ratio of the low-intermediate frequency interference signal to the low-intermediate frequency useful signal is greater than a first preset ratio; and if the energy ratio of the low-intermediate frequency interference signal to the low-intermediate frequency useful signal is greater than the first preset ratio, selecting another local oscillator signal from the preset local oscillator frequency set as a current local oscillator signal to process the input signal.

In order to resolve the above technical problem, another technical solution adopted by the present application is to provide a storage medium. The storage medium is configured to store a computer program. The computer program, when executed by a processor, causes the above method for improving performance of a low-intermediate frequency receiver to be performed.

In order to resolve the above technical problem, another technical solution adopted by the present application is to provide a low-intermediate frequency receiver. The low-intermediate frequency receiver includes a memory and a processor that are interconnected. The memory is configured to store a computer program. The computer program, when executed by a processor, causes the above method for improving performance of a low-intermediate frequency receiver to be performed.

By means of the above solutions, the beneficial effects of the present application are as follows. A local oscillator signal is selected from a preset local oscillator frequency set as an initial local oscillator signal to perform frequency mixing on an input signal, so as to obtain a low-intermediate frequency signal including a low-intermediate frequency useful signal and a low-intermediate frequency interference signal. If an energy ratio of the low-intermediate frequency interference signal to the low-intermediate frequency useful signal is greater than a first preset ratio, another local oscillator signal is selected from the preset local oscillator frequency set as a current local oscillator signal to process the input signal, and then determination is performed again, until the selected local oscillator signal can cause the energy ratio of the low-intermediate frequency interference signal to the low-intermediate frequency useful signal to meet the requirements. In this way, the influence of the adjacent channel interference on the useful signal is reduced, and the ACS of the low-intermediate frequency receiver is improved.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings according to these accompanying drawings without creative efforts.

DETAILED DESCRIPTION OF THE INVENTION

The technical solutions in the embodiments of the present application are clearly and completely described below with reference to the accompanying drawings in the embodiments of the present application. Apparently, the described embodiments are merely some rather than all of the embodiments of the present application. All other embodiments obtained by a person of ordinary skill in the art based on the embodiments of the present application without creative efforts shall fall within the protection scope of the present application.

Figure 1:
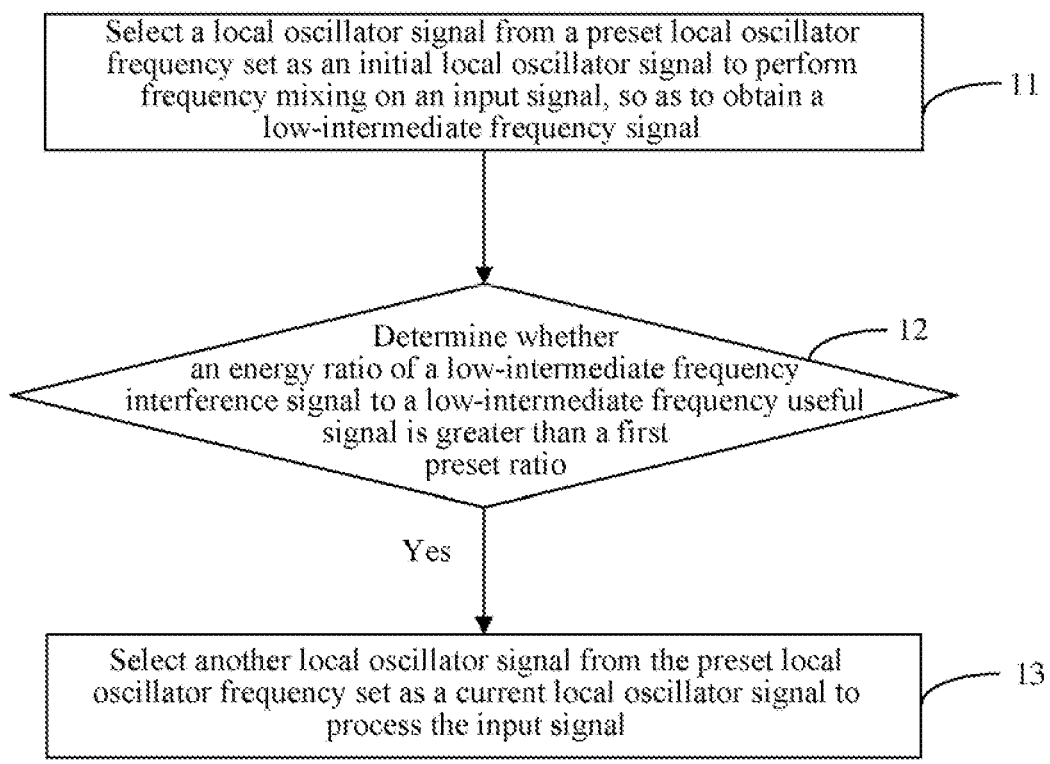
FIG. 1 is a schematic flowchart of an embodiment of a method for improving performance of a low-intermediate frequency receiver according to the present application.

Referring to FIG. 1, FIG. 1 is a schematic flowchart of an embodiment of a method for improving performance of a low-intermediate frequency receiver according to the present application. The method includes the following steps:

Step 11: Select a local oscillator signal from a preset local oscillator frequency set as an initial local oscillator signal to perform frequency mixing on an input signal, so as to obtain a low-intermediate frequency signal.

The preset local oscillator frequency set includes at least two local oscillator signals. Any two local oscillator signals have different frequencies, and may have a same amplitude and phase. The low-intermediate frequency signal includes a low-intermediate frequency useful signal and a low-intermediate frequency interference signal. One local oscillator signal may be selected from the preset frequency set as the initial local oscillator signal according to a preset rule or a random selecting principle.

In a specific embodiment, the input signal may be received by using an antenna. The input signal is a high-frequency signal. Then a local oscillator signal is generated by using a local oscillator (LO). Then down conversion is performed on the local oscillator signal and the input signal by using a frequency mixer, so as to obtain the low-intermediate frequency signal.

Step 12: Determine whether an energy ratio of the low-intermediate frequency interference signal to the low-intermediate frequency useful signal is greater than a first preset ratio.

It may be determined, by using the energy ratio of the low-intermediate frequency interference signal to the low-intermediate frequency useful signal, whether there is relatively great interference of the low-intermediate frequency interference signal to the low-intermediate frequency useful signal.

Step 13: If the energy ratio of the low-intermediate frequency interference signal to the low-intermediate frequency useful signal is greater than the first preset ratio, another local oscillator signal is selected from the preset local oscillator frequency set as a current local oscillator signal to process the input signal.

When the energy ratio of the low-intermediate frequency interference signal to the low-intermediate frequency useful signal is greater than the first preset ratio, it may be determined that, by using the initial local oscillator signal to process the input signal, the generated low-intermediate frequency interference signal has a strong interference to the low-intermediate frequency useful signal, causing strong adjacent channel interference. In order to reduce the adjacent channel interference, another local oscillator signal may be selected from the preset frequency set as the current local oscillator signal to process the input signal.

The present embodiment provides a method for improving performance of a low-intermediate frequency receiver. The local oscillator signal in the preset local oscillator frequency set is cyclically used to process the input signal, so as to generate the low-intermediate frequency useful signal and the low-intermediate frequency interference signal. It is determined whether the energy ratio of the low-intermediate frequency useful signal to the low-intermediate frequency interference signal meets the requirement until the selected local oscillator signal can cause the energy ratio of the generated low-intermediate frequency interference signal to the low-intermediate frequency useful signal to meet the requirements. Therefore, the influence of the adjacent channel interference to the useful signal is reduced, and the ACS of the low-intermediate frequency receiver is improved.

Figure 2:
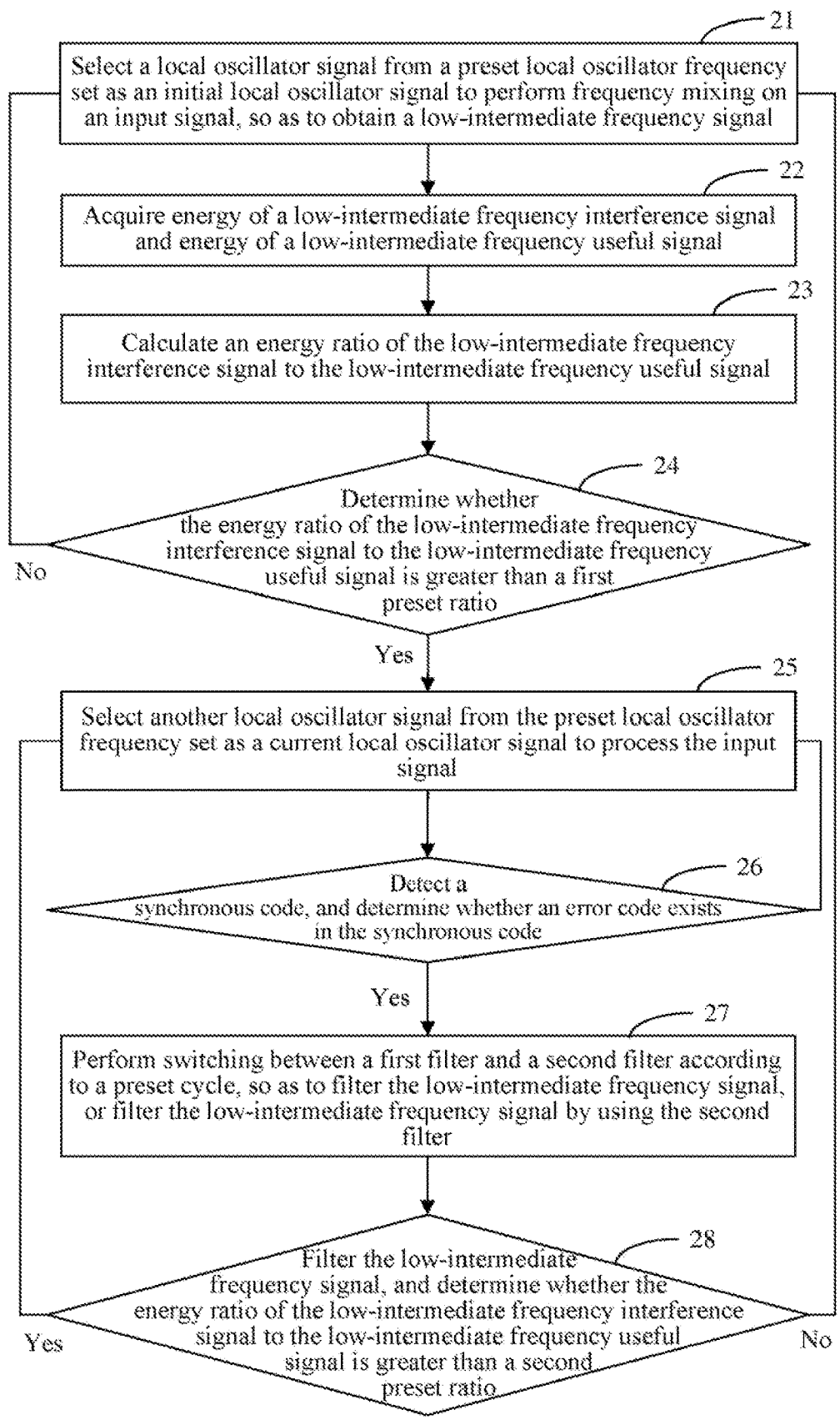
FIG. 2 is a schematic flowchart of another embodiment of a method for improving performance of a low-intermediate frequency receiver according to the present application.

Referring to FIG. 2, FIG. 2 is a schematic flowchart of another embodiment of a method for improving performance of a low-intermediate frequency receiver according to the present application. The method includes the following steps:

Step 21: Select a local oscillator signal from a preset local oscillator frequency set as an initial local oscillator signal to perform frequency mixing on an input signal, so as to obtain a low-intermediate frequency signal.

The input signal includes a radio-frequency signal and an adjacent channel interference signal. A frequency difference between the radio-frequency signal and the adjacent channel interference signal is within a preset range. The low-intermediate frequency useful signal is a signal generated after the radio-frequency signal and the local oscillator signal are mixed. The low-intermediate frequency interference signal is a signal generated after the adjacent channel interference signal and the local oscillator signal are mixed.

Step 22: Acquire energy of the low-intermediate frequency interference signal and energy of the low-intermediate frequency useful signal.

After the low-intermediate frequency interference signal and the low-intermediate frequency useful signal are acquired, an analog to digital converter (ADC) is used to convert the low-intermediate frequency interference signal and the low-intermediate frequency useful signal into digital signals. Then a digital signal processor (DSP) is used to detect the energy of the low-intermediate frequency interference signal and the energy of the low-intermediate frequency useful signal.

Step 23: Calculate an energy ratio of the low-intermediate frequency interference signal to the low-intermediate frequency useful signal.

After the energy of the low-intermediate frequency interference signal and the energy of the low-intermediate frequency useful signal are detected, the energy ratio of the low-intermediate frequency interference signal to the low-intermediate frequency useful signal may be further calculated.

Step 24: Determine whether an energy ratio of the low-intermediate frequency interference signal to the low-intermediate frequency useful signal is greater than a first preset ratio.

Step 25: If the energy ratio of the low-intermediate frequency interference signal to the low-intermediate frequency useful signal is greater than the first preset ratio, another local oscillator signal is selected from the preset local oscillator frequency set as a current local oscillator signal to process the input signal.

If the energy ratio of the low-intermediate frequency interference signal to the low-intermediate frequency useful signal is greater than the first preset ratio, it indicates that the currently used local oscillator signal may cause the low-intermediate frequency interference signal after down conversion to greatly interfere with the low-intermediate frequency useful signal. In this case, the input signal may be processed by using the another local oscillator signal. If the energy ratio of the low-intermediate frequency interference signal to the low-intermediate frequency useful signal is less than or equal to the first preset ratio, it indicates that, after the currently used local oscillator signal and the input signal are mixed, the generated interference of the low-intermediate frequency interference signal to the low-intermediate frequency useful signal is within an allowable range. In this case, the initial local oscillator signal may be still used to process the input signal.

In a specific embodiment, after another local oscillator signal is selected from the preset local oscillator frequency set to process the input signal, filtration is performed by using a hardware channel filter. Specifically, a first filter may be used to filter the low-intermediate frequency signal. The first filter may be a narrowband filter.

Step 26: Detect a synchronous code, and determine whether an error code exists in the synchronous code.

In a specific embodiment, the low-intermediate frequency signal further includes the synchronous code. The synchronous code may be detected to determine whether the error code exists in the synchronous code. The received synchronous code is compared with a preset synchronous code. If the received synchronous code is consistent with the preset synchronous code, it indicates that there is no error code. Otherwise, the error code exists.

Step 27: If the error code exists in the synchronous code, switching is performed between the first filter and a second filter according to a preset cycle to filter the low-intermediate frequency signal. Alternatively, the second filter is directly used to filter the low-intermediate frequency signal after another local oscillator signal is switched.

The second filter may be a broadband filter. A bandwidth of the first filter is less than a bandwidth of the second filter.

In other embodiments, it may be determined, according to a current squelch condition, whether energy detection is required. First, the current squelch condition is acquired. Then it is determined whether the current squelch condition is less than a preset squelch condition. If the current squelch condition is greater than the preset squelch condition, the energy of the low-intermediate frequency interference signal and the energy of the low-intermediate frequency useful signal are acquired.

Step 28: Determine whether the energy ratio of the low-intermediate frequency interference signal to the low-intermediate frequency useful signal is greater than a second preset ratio.

If no error code exists in the low-intermediate frequency signal, the current local oscillator signal is still used to process the input signal, and the low-intermediate frequency signal is filtered by using the first filter.

When the energy ratio of the low-intermediate frequency interference signal to the low-intermediate frequency useful signal is determined to be less than the second preset ratio, the current local oscillator signal is switched to the initial local oscillator signal. When the energy ratio of the low-intermediate frequency interference signal to the low-intermediate frequency useful signal is greater than the second preset ratio, the current local oscillator signal is still used to process the input signal.

Adjacent channel interference may be divided into upper adjacent channel interference and lower adjacent channel interference. Interference randomly exists. Therefore, it is unknown that interference exists in which adjacent channel, and the interference may exist in both an upper adjacent channel and a lower adjacent channel.

In a specific embodiment, the preset local oscillator frequency set includes a first local oscillator signal and a second local oscillator signal. A frequency of the first local oscillator signal is less than a frequency of the second local oscillator signal. A frequency difference between the radio-frequency signal and the first local oscillator signal is the same as a frequency difference between the radio-frequency signal and the second local oscillator signal.

An offset direction of the upper adjacent channel or the lower adjacent channel is an offset direction of the local oscillator signal. When the first local oscillator signal is used to process the input signal, the local oscillator signal is offset toward the upper adjacent channel. When the second local oscillator signal is used to process the input signal, the local oscillator signal is offset toward the lower adjacent channel.

The influence of the upper adjacent channel interference may be first detected. A local oscillator offset value is set to a negative value. The initial local oscillator signal is the first local oscillator signal. A frequency of the first local oscillator signal is less than a frequency of the radio-frequency signal. After the input signal and the first local oscillator signal are mixed and digitized, an energy ratio of an adjacent channel signal on a same side as the offset direction of the first local oscillator signal to the low-intermediate frequency useful signal is calculated. That is to say, the energy ratio of the low-intermediate frequency interference signal to the low-intermediate frequency useful signal in the upper adjacent channel is calculated. If the energy ratio of the low-intermediate frequency interference signal to the low-intermediate frequency useful signal is greater than the first preset ratio, it indicates that there is interference to the upper adjacent channel. The first local oscillator signal is offset to the other side of the radio-frequency signal, that is, the first local oscillator signal is switched to the second local oscillator signal. If the energy ratio of the low-intermediate frequency interference signal to the low-intermediate frequency useful signal is less than or equal to the first preset ratio, the first local oscillator signal is still used to process the input signal.

When the second local oscillator signal is used to process the input signal, cyclic switching may be performed between the first filter and the second filter, or the second filter is directly adopted. The bandwidth of the second filter may include part or all of an upper adjacent channel interference signal. The energy ratio of the low-intermediate frequency interference signal to the low-intermediate frequency useful signal of the upper adjacent channel in the same bandwidth is calculated again, thereby detecting whether the upper adjacent channel interference signal still exists. If there is no interference to the upper adjacent channel or the interference is weakened to a certain extent, the second local oscillator signal is switched back to the first local oscillator signal to perform receiving.

When the second local oscillator signal is used to process the input signal, an interference signal of the upper adjacent channel may be detected after it is detected that the error code exists in the synchronous code. Alternatively, when the current squelch condition does not meet the preset squelch condition, the interference signal of the upper adjacent channel is detected.

Similarly, it may be detected whether the lower adjacent channel interference signal has a large influence on the local oscillator signal. In this way, it may be determined which local oscillator signal is used to process the input signal, so as to guarantee that the generated low-intermediate frequency useful signal is subjected to minimum interference.

Figure 3:
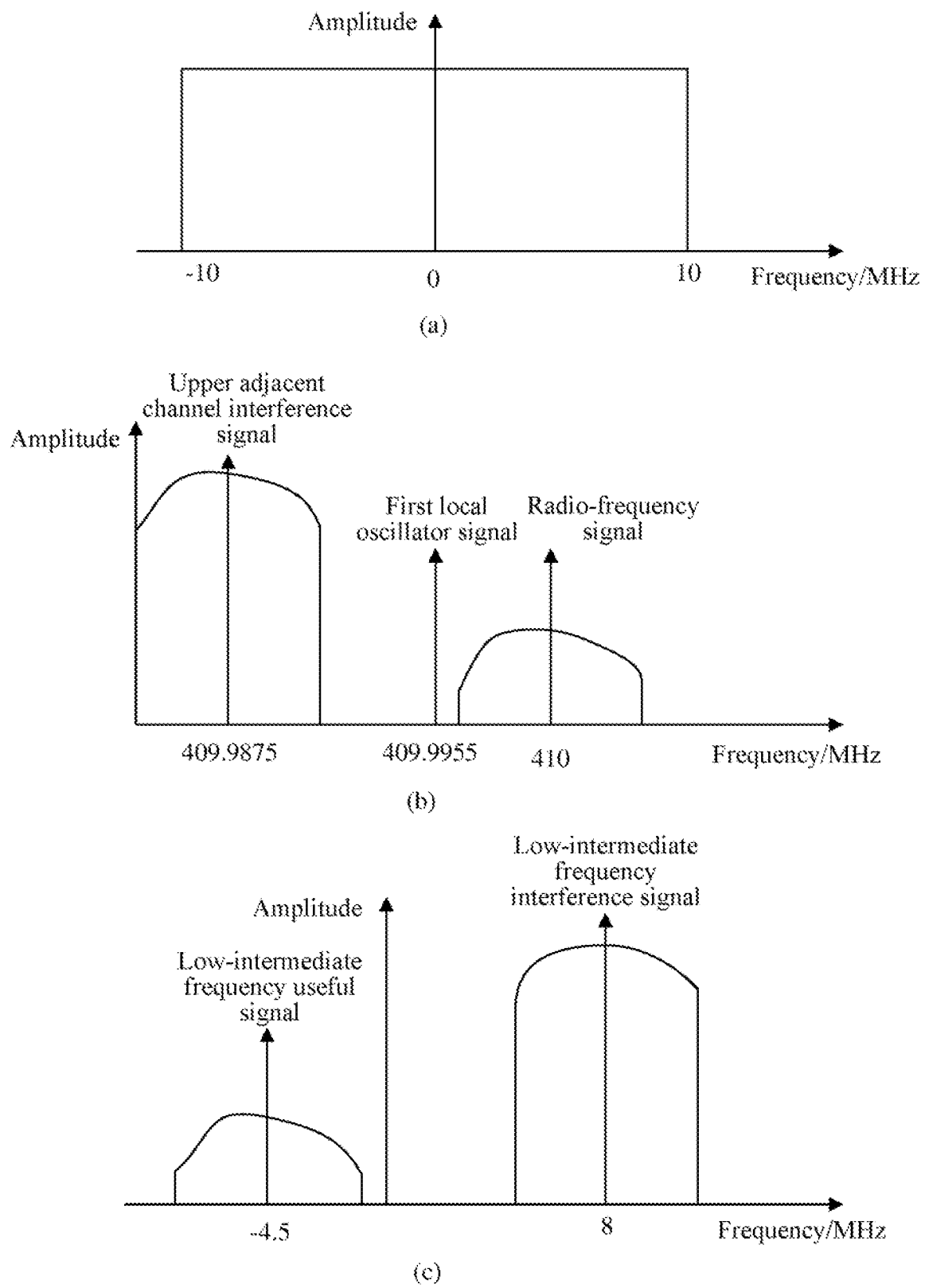
FIG. 3 is a schematic diagram of a spectrum of signals in another embodiment of a method for improving performance of a low-intermediate frequency receiver according to the present application.

For example, assuming that there is no interference to the lower adjacent channel, as shown in FIG. 3. FIG. 3(a) is a schematic Bode diagram of a narrowband filter, showing a bandwidth being 20 KHz. FIG. 3(b) is a schematic diagram of a spectrum of the first local oscillator signal, the radio-frequency signal, and the upper adjacent channel interference signal before frequency mixing. FIG. 3(c) is a schematic diagram of a spectrum of the low-intermediate frequency useful signal and the low-intermediate frequency interference signal that have the same bandwidth after frequency mixing.

Assuming that a frequency of the preset local oscillator signal is 410 MHz, a frequency of the radio-frequency signal is also 410 MHz, and an offset value of the local oscillator is −4.5 KHz, a frequency of the first local oscillator signal is: 410 MHz−4.5 KHz=409.9955 MHz. A frequency difference between the upper adjacent channel interference signal and the radio-frequency signal is −12.5 KHz, that is, the frequency of the upper adjacent channel interference signal is: 410 MHz−12.5 KHz=409.9875 MHz. After frequency mixing, a frequency of the low-intermediate frequency useful signal is: 409.9955 MHz−410 MHz=−4.5 KHz. The frequency of the low-intermediate frequency interference signal is: 409.9955 MHz−409.9875 MHz=8 KHz.

Figure 4:
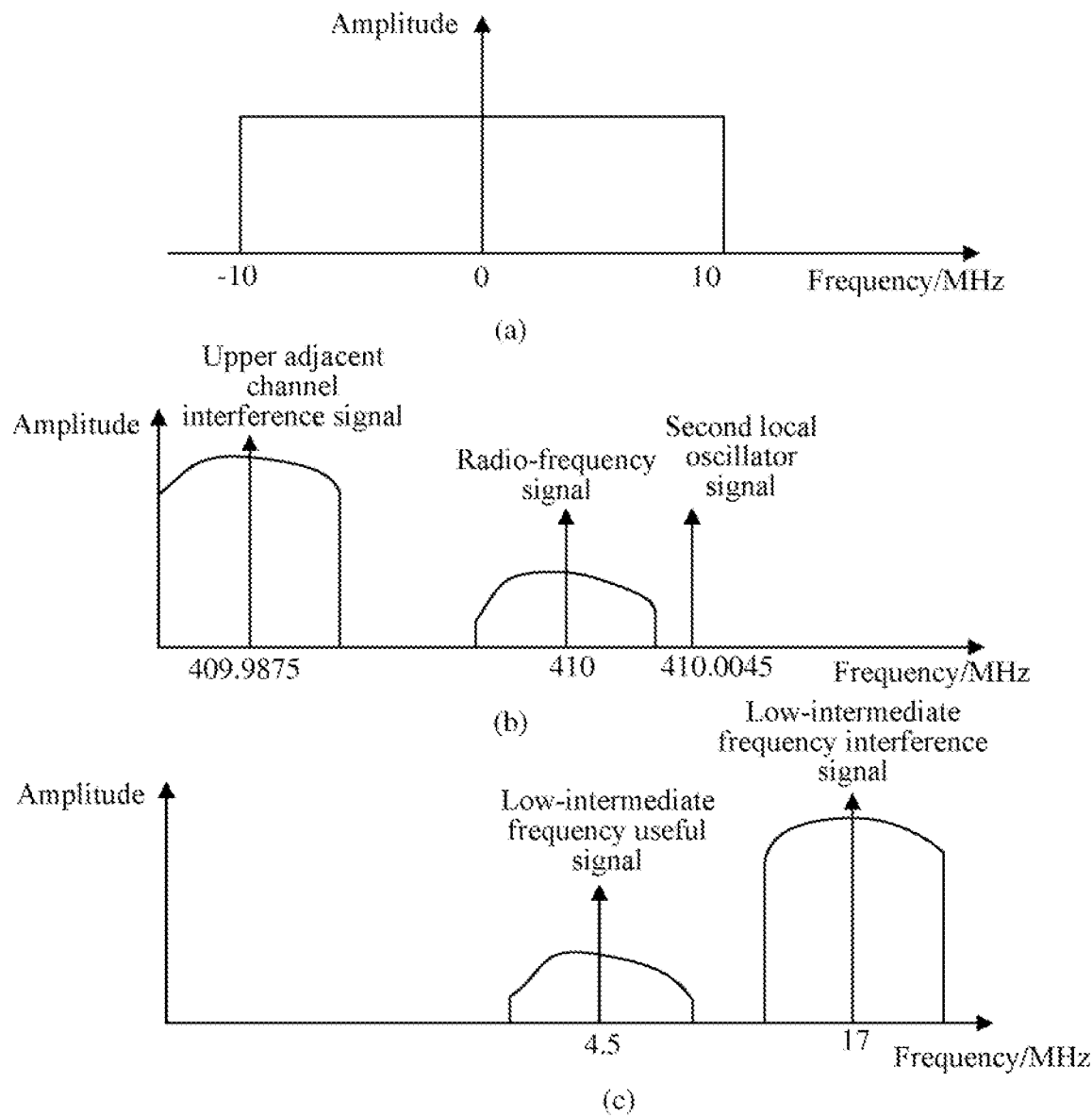
FIG. 4 is a schematic diagram of another spectrum of signals in another embodiment of a method for improving performance of a low-intermediate frequency receiver according to the present application.
Figure 5:
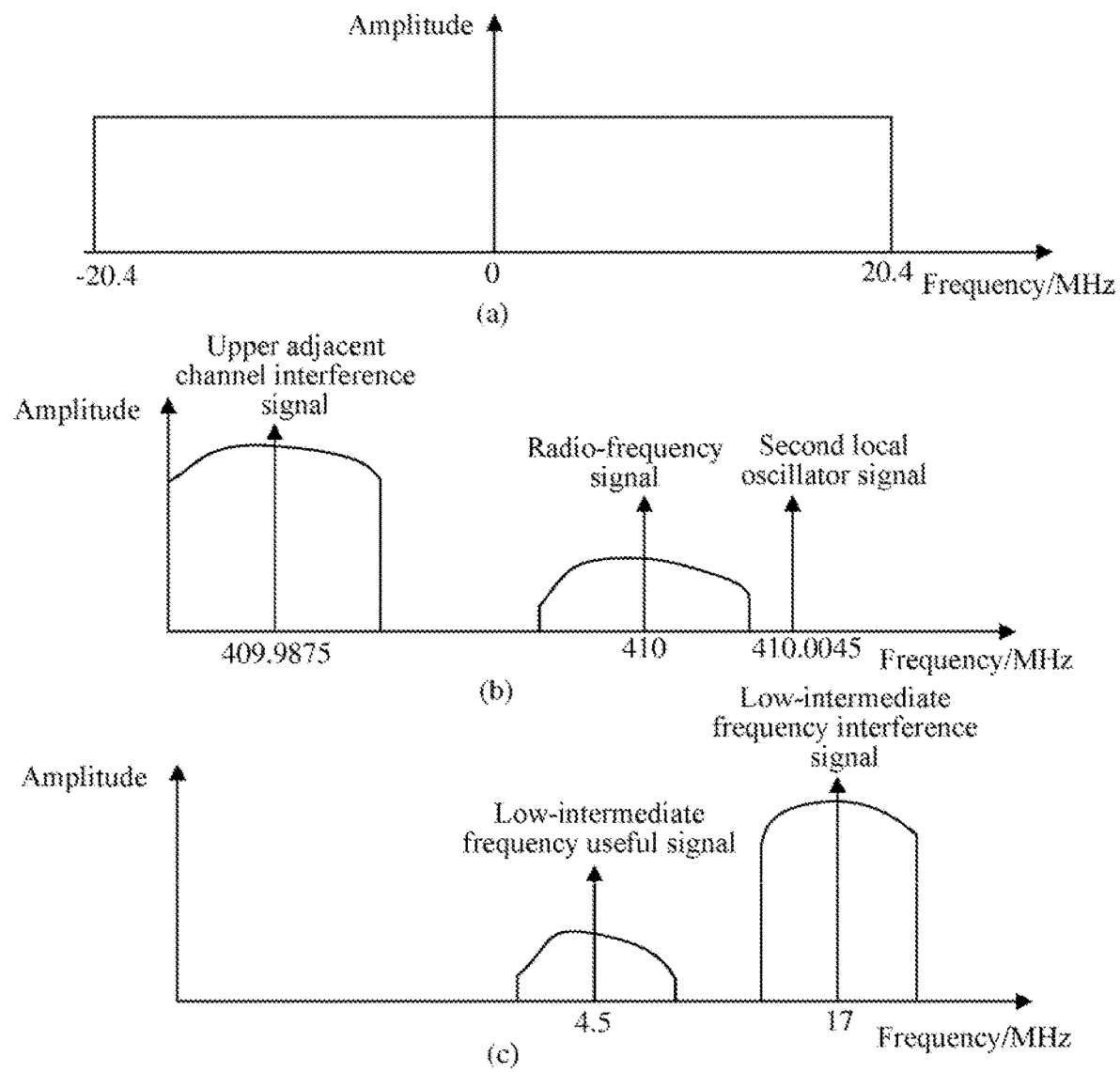
FIG. 5 is a schematic diagram of still another spectrum of signals in another embodiment of a method for improving performance of a low-intermediate frequency receiver according to the present application.

When the interference to the upper adjacent channel is relatively strong, the second local oscillator signal is selected to process the input signal. As shown in FIG. 4 and FIG. 5, FIG. 4(a) is a schematic Bode diagram of the narrowband filter, showing the bandwidth being 20 KHz. FIG. 4(b) is a schematic diagram of a spectrum of the second local oscillator signal, the radio-frequency signal, and the upper adjacent channel interference signal before frequency mixing. FIG. 4(c) is a schematic diagram of a spectrum of the low-intermediate frequency useful signal and the low-intermediate frequency interference signal that have the same bandwidth after frequency mixing. FIG. 5(a) is a schematic Bode diagram of the broadband filter, showing a bandwidth being 40.8 KHz. FIG. 5(b) is a schematic diagram of a spectrum of the second local oscillator signal, the radio-frequency signal, and the upper adjacent channel interference signal before frequency mixing. FIG. 5(c) is a schematic diagram of a spectrum of the low-intermediate frequency useful signal and the low-intermediate frequency interference signal that have the same bandwidth after frequency mixing.

When the local oscillator signal is shifted, for receiving, to a side at which the lower adjacent channel is located, the offset value of the local oscillator is 4.5 KHz, that is, the frequency of the second local oscillator signal is: 410 MHz+4.5 KHz=410.0045 MHz. The frequency of the low-intermediate frequency useful signal is: 410.0045 MHz−410 MHz=4.5 KHz. The frequency of the low-intermediate frequency interference signal is: 410.0045−409.9875 MHz=17 KHz.

At the beginning, the narrowband filter may be used to filter the low-intermediate frequency signal. Then, a hardware channel filter is cyclically switched to the broadband filter, or the hardware channel filter may be not cyclically switched, but the broadband filter is directly used for filtration. After the hardware channel filter is switched to the broadband filter, the energy ratio of the low-intermediate frequency interference signal to the low-intermediate frequency useful signal of the upper adjacent channel is calculated again, to detect whether the upper adjacent channel interference signal disappears or is weakened to a certain extent. If the upper adjacent channel interference signal has disappeared, the local oscillator signal is changed to the first local oscillator signal. If the upper adjacent channel interference signal still exists and has a large influence on the useful signal, the local oscillator signal is maintained to be the second local oscillator signal. If a manner of cyclically switching the hardware channel filter is adopted, after energy detection on the low-intermediate frequency interference signal and the low-intermediate frequency useful signal of the upper adjacent channel is finished, the hardware channel filter may be switched to the narrowband filter.

By means of the solution in the present embodiment, acquired indexes of the low-intermediate frequency receiver are shown in Table I to Table III.

TABLE I

ACS indexes of a static low-intermediate frequency solution

| | | Adjacent channel offset value | |
|---|---|---|---|
| | Frequency | +12.5 KHz | −12.5 KHz |
| ACS | L | 62.5 dB | 39 dB |
| | M | 63 dB | 35 dB |
| | H | 63.5 dB | 40 dB |

L is a low frequency and has a frequency of about 350 MHz. M is an intermediate frequency and has a frequency of about 450 MHz. H is a high frequency and has a frequency of about 500 MHz.

TABLE II

ACS indexes of a dynamic low-intermediate frequency solution

| | | Adjacent channel offset value | |
|---|---|---|---|
| | Frequency | +12.5 KHz | −12.5 KHz |
| ACS | L | 62.5 dB | 62.8 dB |

TABLE II-continued

ACS indexes of a dynamic low-intermediate frequency solution

| | Adjacent channel offset value | |
|---|---|---|
| Frequency | +12.5 KHz | −12.5 KHz |
| M | 64.4 dB | 62.3 dB |
| H | 65 dB | 62.9 dB |

It may be learned from data in Table I and Table II that, compared with the ACS of a existing static low-intermediate frequency solution, the dynamic low-intermediate frequency solution used in the present embodiment enhances the ACS of the upper adjacent channel.

TABLE III

Anti-blocking performance test result of the dynamic low-intermediate frequency solution

| Offset frequency | Zero-intermediate frequency | Low-intermediate frequency | Attenuator | Attenuator and low-intermediate frequency |
|---|---|---|---|---|
| +1 MHz | 75 | 83 | 79 | 94 |
| −1 MHz | 73 | 83 | 78 | 92 |
| +10 MHz | 75 | 85 | 79 | 94 |
| −10 MHz | 72 | 83 | 78 | 91 |

A test frequency is 435.099 MHz. Received signal strength indication (RSSI) is −90 dBm. An interference signal is a digital mobile radio (DMR) signal. It may be seen from Table III that, compared with a zero-intermediate frequency solution, by using the solution of the present embodiment as well as the attenuator, the anti-blocking performance is increased by a maximum of 19 dB, and the anti-blocking performance of the low-intermediate frequency solution is increased by a maximum of 8-11 dB compared with the zero-intermediate frequency solution.

By means of the low-intermediate frequency solution, both the problem of blocking and direct current in the zero-intermediate frequency solution and the problem of poor performance of ACS on one side existing in the static low-intermediate frequency solution are resolved. According to the existence situation of adjacent channel interference, the frequency switching of the local oscillator signal may be realized without influencing the performance of ACS, and resistance to large signal blocking can also be improved.

Figure 6:
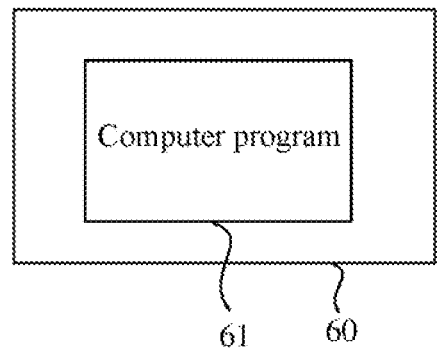
FIG. 6 is a schematic structural diagram of an embodiment of a storage medium according to the present application.

Referring to FIG. 6, FIG. 6 is a schematic structural diagram of an embodiment of a storage medium according to the present application. The storage medium 60 is configured to store a computer program 61. The computer program 61, when executed by a processor, causes the above method for improving performance of a low-intermediate frequency receiver to be performed.

The storage medium 60 may be various media such as a server, a USB flash disk, a mobile hard disk drive, a read-only memory (ROM), a random access memory (RAM), a magnetic disk, an optical disc, or the like that are capable of storing program code.

Figure 7:
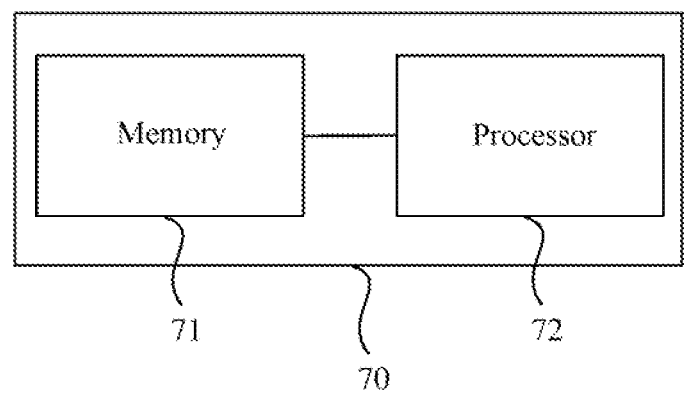
FIG. 7 is a schematic structural diagram of an embodiment of a low-intermediate frequency receiver according to the present application.

Referring to FIG. 7, FIG. 7 is a schematic structural diagram of an embodiment of a low-intermediate frequency receiver according to the present application. The low-intermediate frequency receiver 70 includes a memory 71 and a processor 72 that are interconnected. The memory 71 is configured to store a computer program. The computer program, when executed by the processor 72, causes the above method for improving performance of the low-intermediate frequency receiver to be performed.

By selecting a proper local oscillator signal, the energy ratio of the low-intermediate frequency interference signal to the low-intermediate frequency useful signal that are generated by using the local oscillator signal and the input signal can meet the requirement. Therefore, the influence of the adjacent channel interference to the useful signal is reduced, and the ACS of the low-intermediate frequency receiver is improved.

In the several implementations provided in the present application, it should be understood that the disclosed method and device may be implemented in other manners. For example, the described device implementations described above are merely exemplary. For example, the module or unit division is merely logical function division and there may be other division manners during actual implementation. For example, a plurality of units or components may be combined or integrated into another system, or some features may be ignored or not performed.

The units described as separate components may or may not be physically separated, and the components displayed as units may or may not be physical units, and may be located in one place or may be distributed over a plurality of network units. Some or all of the units may be selected according to actual requirements to achieve the objectives of the solutions of the implementations.

In addition, functional units in the embodiments of the present application may be integrated into one processing unit, or each of the units may exist alone physically, or two or more units may be integrated into one unit. The integrated functional module may be implemented in the form of hardware, or may be implemented in the form of a software functional module.

The foregoing descriptions are embodiments of the present application, and the protection scope of the present application is not limited thereto. All equivalent structure or process changes made according to the content of this specification and accompanying drawings in the present application or by directly or indirectly applying the present application in other related technical fields shall fall within the protection scope of the present application.

What is claimed is:

1. A method for improving performance of a low-intermediate frequency receiver, the method comprising:
selecting a local oscillator signal from a preset local oscillator frequency set as an initial local oscillator signal to perform frequency mixing on an input signal, so as to obtain a low-intermediate frequency signal, wherein the low-intermediate frequency signal comprises a low-intermediate frequency useful signal and a low-intermediate frequency interference signal;
determining whether an energy ratio of the low-intermediate frequency interference signal to the low-intermediate frequency useful signal is greater than a first preset ratio; and
if so, selecting another local oscillator signal from the preset local oscillator frequency set as a current local oscillator signal to process the input signal,
wherein before the step of determining whether the energy ratio of the low-intermediate frequency interference signal to the low-intermediate frequency useful signal is greater than the first preset ratio, the method comprises:
acquiring energy of the low-intermediate frequency interference signal and energy of the low-intermediate frequency useful signal; and calculating the energy ratio of the low-intermediate frequency interference signal to the low-intermediate frequency useful signal.

2. The method for improving performance of a low-intermediate frequency receiver according to claim 1, the method further comprising:
if the energy ratio of the low-intermediate frequency interference signal to the low-intermediate frequency useful signal is less than or equal to the first preset ratio, still using the initial local oscillator signal to process the input signal.

3. The method for improving performance of a low-intermediate frequency receiver according to claim 1, wherein the low-intermediate frequency signal further comprises a synchronous code, and the method further comprises:
detecting the synchronous code, and determining whether an error code exists in the synchronous code; and
if so, performing switching between a first filter and a second filter according to a preset cycle to filter the low-intermediate frequency signal, or performing switching to the another local oscillator signal and then directly filtering the low-intermediate frequency signal by using the second filter, and determining whether the energy ratio of the low-intermediate frequency interference signal to the low-intermediate frequency useful signal is greater than a second preset ratio, wherein
a bandwidth of the first filter is less than a bandwidth of the second filter.

4. The method for improving performance of a low-intermediate frequency receiver according to claim 3, the method further comprising:
performing switching from the current local oscillator signal to the initial local oscillator signal when it is determined that the energy ratio of the low-intermediate frequency interference signal to the low-intermediate frequency useful signal is less than the second preset ratio.

5. The method for improving performance of a low-intermediate frequency receiver according to claim 1, the method further comprising:
acquiring a current squelch condition, and determining whether the current squelch condition is less than a preset squelch condition; and
if not, acquiring energy of the low-intermediate frequency interference signal and energy of the low-intermediate frequency useful signal.

6. The method for improving performance of a low-intermediate frequency receiver according to claim 1, wherein
the input signal comprises a radio-frequency signal and an adjacent channel interference signal, a frequency difference between the radio-frequency signal and the adjacent channel interference signal is within a preset range, the low-intermediate frequency useful signal is a signal generated by mixing the radio-frequency signal with the local oscillator signal, and the low-intermediate frequency interference signal is a signal generated by mixing the adjacent channel interference signal with the local oscillator signal.

7. The method for improving performance of a low-intermediate frequency receiver according to claim 6, wherein
the preset local oscillator frequency set comprises a first local oscillator signal and a second local oscillator signal, a frequency of the first local oscillator signal is less than a frequency of the second local oscillator signal, a frequency difference between the radio-frequency signal and the first local oscillator signal is the same as a frequency difference between the radio-frequency signal and the second local oscillator signal, and the interference signal comprises an upper adjacent channel interference signal and a lower adjacent channel interference signal.

8. A non-transitory computer-readable storage medium, configured to store a computer program, wherein the computer program, when executed by a processor, causes the method for improving performance of a low-intermediate frequency receiver according to claim 1 to be performed.

9. The non-transitory computer-readable storage medium according to claim 8, the method further comprising:
if the energy ratio of the low-intermediate frequency interference signal to the low-intermediate frequency useful signal is less than or equal to the first preset ratio, still using the initial local oscillator signal to process the input signal.

10. The non-transitory computer-readable storage medium according to claim 8, wherein the low-intermediate frequency signal further comprises a synchronous code, and the method further comprises:
detecting the synchronous code, and determining whether an error code exists in the synchronous code; and
if so, performing switching between a first filter and a second filter according to a preset cycle to filter the low-intermediate frequency signal, or performing switching to the another local oscillator signal and then directly filtering the low-intermediate frequency signal by using the second filter, and determining whether the energy ratio of the low-intermediate frequency interference signal to the low-intermediate frequency useful signal is greater than a second preset ratio, wherein
a bandwidth of the first filter is less than a bandwidth of the second filter.

11. The non-transitory computer-readable storage medium according to claim 10, the method further comprising:
performing switching from the current local oscillator signal to the initial local oscillator signal when it is determined that the energy ratio of the low-intermediate frequency interference signal to the low-intermediate frequency useful signal is less than the second preset ratio.

12. The non-transitory computer-readable storage medium according to claim 8, the method further comprising:
acquiring a current squelch condition, and determining whether the current squelch condition is less than a preset squelch condition; and
if not, acquiring energy of the low-intermediate frequency interference signal and energy of the low-intermediate frequency useful signal.

13. A low-intermediate frequency receiver, comprising a memory and a processor that are interconnected, wherein the memory is configured to store a computer program, and the computer program, when executed by the processor, causes the method for improving performance of a low-intermediate frequency receiver according to claim 1 to be performed.

14. The low-intermediate frequency receiver according to claim 13, the method further comprising:
if the energy ratio of the low-intermediate frequency interference signal to the low-intermediate frequency useful signal is less than or equal to the first preset ratio, still using the initial local oscillator signal to process the input signal.

15. The low-intermediate frequency receiver according to claim 13, wherein the low-intermediate frequency signal further comprises a synchronous code, and the method further comprises:

detecting the synchronous code, and determining whether an error code exists in the synchronous code; and
    if so, performing switching between a first filter and a second filter according to a preset cycle to filter the low-intermediate frequency signal, or performing switching to the another local oscillator signal and then directly filtering the low-intermediate frequency signal by using the second filter, and determining whether the energy ratio of the low-intermediate frequency interference signal to the low-intermediate frequency useful signal is greater than a second preset ratio, wherein
    a bandwidth of the first filter is less than a bandwidth of the second filter.

16. The low-intermediate frequency receiver according to claim 15, the method further comprising:

performing switching from the current local oscillator signal to the initial local oscillator signal when it is determined that the energy ratio of the low-intermediate frequency interference signal to the low-intermediate frequency useful signal is less than the second preset ratio.

17. The low-intermediate frequency receiver according to claim 13, the method further comprising:

acquiring a current squelch condition, and determining whether the current squelch condition is less than a preset squelch condition; and
    if not, acquiring energy of the low-intermediate frequency interference signal and energy of the low-intermediate frequency useful signal.

* * * * *